(12) United States Patent
Heinzelmann et al.

(10) Patent No.: US 9,138,884 B2
(45) Date of Patent: Sep. 22, 2015

(54) HANDHELD WORK APPARATUS

(75) Inventors: Georg Heinzelmann, Winnenden (DE); Gernot Liebhard, Waiblingen (DE); Dirk Förstner, Weinstadt (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 715 days.

(21) Appl. No.: 13/230,298

(22) Filed: Sep. 12, 2011

(65) Prior Publication Data

US 2012/0066916 A1  Mar. 22, 2012

(30) Foreign Application Priority Data

Sep. 18, 2010 (DE) .......................... 10 2010 045 994

(51) Int. Cl.
- *B23Q 11/14* (2006.01)
- *B25F 5/00* (2006.01)

(52) U.S. Cl.
CPC ................ *B25F 5/008* (2013.01); *B23Q 11/14* (2013.01)

(58) Field of Classification Search
CPC ......... B23Q 11/14; B25F 5/008; B27B 17/00; B23D 57/023
USPC ........................................ 30/381–387; D8/65
See application file for complete search history.

(56) References Cited

U.S. PATENT DOCUMENTS

| 4,198,752 | A | * | 4/1980 | Bross .............................. 30/381 |
|---|---|---|---|---|
| 4,483,072 | A | * | 11/1984 | Nagashima et al. ............ 30/381 |
| 4,592,445 | A | * | 6/1986 | Sawada ........................... 181/229 |
| 4,787,924 | A | * | 11/1988 | Nagashima et al. ............ 30/383 |
| 4,930,583 | A | * | 6/1990 | Fushiya et al. ................. 173/109 |
| 5,018,492 | A | * | 5/1991 | Wolf et al. ....................... 30/381 |
| 5,233,750 | A | * | 8/1993 | Wolf et al. ....................... 30/382 |
| 6,761,136 | B2 | * | 7/2004 | Ohsawa ....................... 123/41.56 |
| 6,826,895 | B2 | | 12/2004 | Iida et al. |
| 6,866,105 | B2 | | 3/2005 | Pfisterer et al. |
| 6,967,464 | B2 | * | 11/2005 | Heigl et al. .................... 320/107 |
| D536,590 | S | * | 2/2007 | Busschaert .................... D8/65 |
| D560,456 | S | * | 1/2008 | Gieske et al. .................. D8/65 |
| D575,605 | S | * | 8/2008 | Yamamoto et al. ............. D8/65 |
| D615,836 | S | * | 5/2010 | Kosugi et al. .................. D8/65 |
| D636,652 | S | * | 4/2011 | Mehra ............................ D8/65 |
| RE42,468 | E | * | 6/2011 | Heigl et al. .................... 320/107 |
| D642,885 | S | * | 8/2011 | Sugishita et al. ............... D8/65 |
| D660,120 | S | * | 5/2012 | Tajik et al. ...................... D8/65 |
| 8,757,288 | B2 | * | 6/2014 | Heinzelmann et al. ......... 30/381 |
| 8,869,912 | B2 | | 10/2014 | Rosskamp et al. |
| 2004/0021377 | A1 | * | 2/2004 | Mazuka et al. ................ 310/59 |

(Continued)

FOREIGN PATENT DOCUMENTS

| CN | 102441877 | A | * | 5/2012 |
|---|---|---|---|---|
| DE | 103 29 828 | A1 | | 1/2005 |

(Continued)

*Primary Examiner* — Jason Daniel Prone
(74) *Attorney, Agent, or Firm* — Walter Ottesen P.A.

(57) ABSTRACT

A handheld work apparatus has an electric drive motor (24) and a power supply unit for the drive motor (24). The power supply unit is arranged in a receptacle (7) of a housing (2) of the work apparatus. The work apparatus has an electronic control (17) and a blower wheel (29) for conveying cooling air. The blower wheel (29) is driven by a drive motor (24). The housing (2) has at least one air inlet opening (10) for cooling air via which the blower wheel (29) draws in a first cooling air flow (22) during operation. A second cooling air flow (23) is drawn into the housing (2) via the receptacle (7).

14 Claims, 4 Drawing Sheets

(56) References Cited

U.S. PATENT DOCUMENTS

| | | | |
|---|---|---|---|
| 2004/0098869 A1* | 5/2004 | Ashfield | 30/383 |
| 2009/0100688 A1* | 4/2009 | Sugishita | 30/381 |
| 2010/0083511 A1* | 4/2010 | Shimokawa et al. | 30/381 |
| 2010/0122683 A1* | 5/2010 | Kawana et al. | 123/195 |
| 2010/0170538 A1* | 7/2010 | Baker et al. | 30/124 |
| 2010/0218385 A1* | 9/2010 | Mang et al. | 30/298 |
| 2010/0218386 A1* | 9/2010 | Roβkamp et al. | 30/277.4 |
| 2010/0218967 A1* | 9/2010 | Roβkamp et al. | 173/217 |

FOREIGN PATENT DOCUMENTS

| | | |
|---|---|---|
| DE | 10 2007 039 828 B3 | 11/2008 |
| DE | 102010045994 A1 * | 3/2012 |
| EP | 2431132 A2 * | 3/2012 |

* cited by examiner

HANDHELD WORK APPARATUS

CROSS REFERENCE TO RELATED APPLICATION

This application claims priority of German patent application no. 10 2010 045 994.1, filed Sep. 18, 2010, the entire content of which is incorporated herein by reference.

FIELD OF THE INVENTION

The invention relates to a hand held work apparatus having an electric drive motor and a power supply unit for the drive motor.

BACKGROUND OF THE INVENTION

DE 10 2007 039 828 B3 discloses an electric machine tool having a blower and a battery. The electric machine tool is configured as a hammer drill and has air inlet openings in the rear housing region. The cooling air is drawn in through the housing in the direction of the battery via the motor arranged adjacent to the air inlet openings and exits the housing above the battery.

In order to achieve sufficient cooling of the drive motor, a sufficient amount of cooling air must be conveyed through the housing. With very large air inlet openings the risk that dirt particles can be drawn into the housing is increased. With small air inlet openings, the movement of a large volume flow leads to high flow velocities and negative pressures which likewise can promote the drawing in of dirt particles. In particular, the electronic control is sensitive to heat as well as dirt. Here, a sufficient cooling must be ensured and simultaneously it must be ensured that the electronic control does not become excessively contaminated with dirt.

SUMMARY OF THE INVENTION

It is an object of the invention to provide a handheld work apparatus of the type described above which has sufficient cooling with little tendency for dirt accumulation.

The handheld work apparatus of the invention includes: an electric drive motor; a power supply unit for the drive motor; a housing having a receptacle for the power supply unit; an electronic control; a fan wheel for moving cooling air; the drive motor being configured to drive the fan wheel; a housing having at least one air inlet opening for cooling air; the fan wheel drawing in a first cooling air flow through the air inlet opening during operation; and, the work apparatus being configured to facilitate drawing in a second cooling air flow via the receptacle of the power supply unit.

Only a partial cooling air flow is drawn in via the air inlet opening. A second partial cooling air flow is drawn in via the receptacle of the power supply unit. By dividing the total cooling air flow into multiple partial cooling air flows, which are drawn in at different locations, the inlet opening for each partial air flow can be kept comparatively small. The total draw-in area can be enlarged so that low flow velocities result. The receptacle of the power supply unit is typically arranged in a region where only little contamination occurs, so that comparatively clean cooling air can be drawn in from this region. Because of the constructively formed small distance between the power supply unit and the receptacle no further measures for covering the inlet opening are necessary.

Advantageously, the receptacle for the power supply unit is arranged in a region which faces away from the tool of the work apparatus. Clean cooling air can be drawn in from this region. The air inlet opening for the first cooling air flow is, in particular, situated closer to the tool than the receptacle of the power supply unit. Air which is more likely to be dirty is thus drawn in via the air inlet opening. In particular, a first gap, via which the second cooling air flow is drawn in, is formed between the power supply unit and the edge of the receptacle. As a result of the drawing-in via a gap, the penetration of dirt particles which are larger than the gap is constructively prevented. The second cooling air flow, in particular, serves to cool the control. Advantageously, the control has at least one cooling rib around which cooling air flows during operation. In this way, the control is cooled by air of the second cooling air flow which is more likely to be clean. Thus, contamination of the control is prevented.

Advantageously, the housing has an interior housing space in which the control is arranged. Thereby, the interior housing space is separated from the receptacle of the power supply unit, in particular, by an intermediate plate. Thus, a simple configuration is achieved. The intermediate plate can, for example, be part of a contact carrier of the power supply unit. The air inlet opening for the first cooling air flow advantageously leads into the interior housing space. In the typical working position of the work apparatus, the control is arranged above the air inlet opening for the first cooling air flow. If the first cooling air flow is partially redirected to the control, then it must flow upward, whereby any heavier dirt particles may fall downward. As a result of the redirection and the upward flow, a partial cleansing of the first cooling air flow is achieved. This prevents larger dirt particles from reaching the control.

In particular, a second gap, through which the second cooling air flow flows into the interior housing space of the work apparatus, is formed between the intermediate plate and the housing wall of the housing. The second gap can be made simply without any additional means. Sealing of the intermediate plate relative to the housing wall can be omitted, so that a simple configuration results. Because the gap can extend over a large portion of the periphery of the intermediate plate, a long gap length and thus a comparatively large total area via which the second cooling air flow can pass from the receptacle into the interior housing space, will result. Thus, low flow velocities are achieved. The control is, in particular, arranged adjacent to a section of the second gap. The control is thus cooled mainly by the second, clean cooling air flow.

The work apparatus has a first longitudinal side and a second longitudinal side situated opposite to the first longitudinal side. The air inlet opening is arranged on the first longitudinal side. An advantageous cooling air guidance results when the first cooling air flow enters into the housing at the first longitudinal side and flows from the first longitudinal side in the direction onto the second longitudinal side. The first cooling air flow is redirected in the housing adjacent to the second longitudinal side and flows back in the direction of the first longitudinal side. Advantageously, the drive motor is located in the flow path from the second longitudinal side to the first longitudinal side and the control is located in the flow path from the first longitudinal side to the second longitudinal side, so that the cooling air first flows over the control and subsequently flows through the drive motor. Advantageously, the first cooling air flow and the second cooling air flow together from the first to the second longitudinal side. The first cooling air flow and the second cooling air flow exit the housing via a common air outlet opening. The air outlet opening is advantageously arranged in the region of the first longitudinal side and underneath the air inlet opening.

Advantageously, the second cooling air flow flows out of the receptacle of the power supply unit into the interior housing space at the first as well as the second longitudinal side. In particular, the second cooling air flow also flows into the interior housing space at the top side of the housing. Thus, a large flow area is achieved with a small gap width.

The power supply unit advantageously is a battery pack. It can, however, also be provided that the power supply unit comprises one or more batteries. The drive motor advantageously is an external rotor motor and the blower wheel is integrated on the rotor of the drive motor. The work apparatus, in particular, is a chain saw having a rear handle and a bale handle. The receptacle for the power supply unit is arranged on the top side of the housing in an area between the rear handle and the bale handle.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
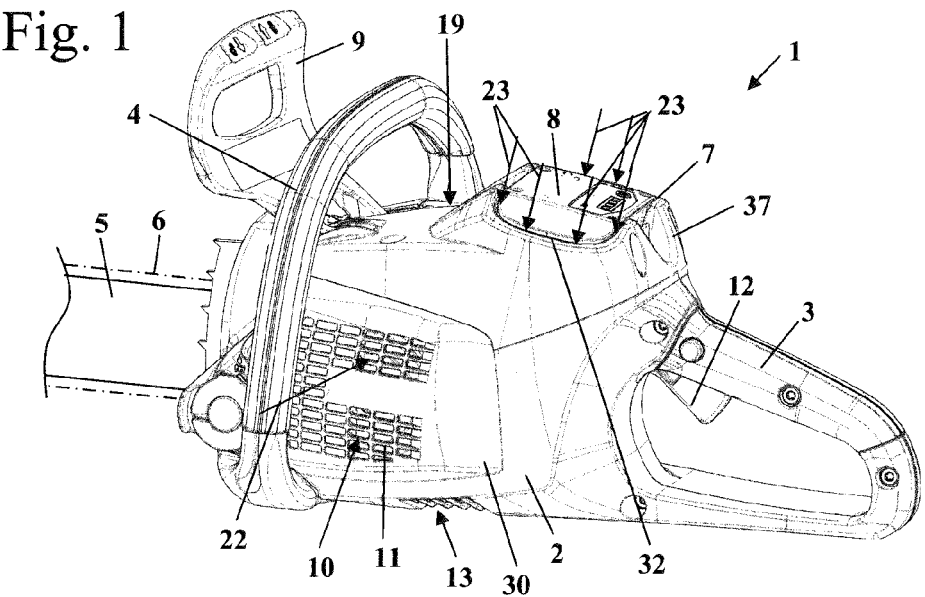
FIG. 1 is a perspective view of the chain saw.

FIG. 1 shows a chain saw 1 as an embodiment of a hand-held work apparatus. The chain saw 1 has a housing 2 which is closed on its top side 19 by a housing cover 37. FIG. 1 shows the chain saw 1 in the typical working position. In the typical working position, the top side 19 is arranged facing away from the ground. A rear handle 3 as well as a bale handle 4 are arranged on the housing 2. The bale handle 4 extends over the housing 2. The chain saw 1 has a guide bar 5 which projects forward and on which a saw chain 6 is driven in peripheral movement around the periphery. A hand guard 9 is arranged between the bale handle 4 and the guide bar 5.

A receptacle 7 is formed in the housing 2. A battery pack 8 is arranged in the receptacle 7 as a power supply unit. The receptacle 7 opens in the upward direction in the area of the housing cover 37. The receptacle 7 opens at the top side 19 of the housing in an area between the back handle 3 and the bale handle 4. A first gap 32 is formed between the battery pack 8 and the wall of the receptacle 7. The first gap 32 extends over the entire periphery of the battery pack 8. The housing 2 has a first longitudinal side 30 which is arranged in the front in FIG. 1 and has an air inlet opening 10 arranged therein. The air inlet opening 10 is divided into a plurality of partial openings by a grid 11. For reasons of appearance, the grid 11 continues forward even though no inlet opening into the housing interior is provided here. In the embodiment, only the three columns of the grid 11 facing the back handle are arranged in the area of the air inlet opening 10. A first cooling air flow 22 is drawn into the interior of the housing 2 via the air inlet opening 10. A second cooling air flow 23 is drawn in via the first gap 32 at the periphery of the battery pack 8.

As FIG. 1 also shows, a throttle lever 12 is arranged on the back handle 3. On the side of the housing 2 facing away from the top side 19, an air outlet opening 13 is provided adjacent to the first longitudinal side 30.

Figure 2:
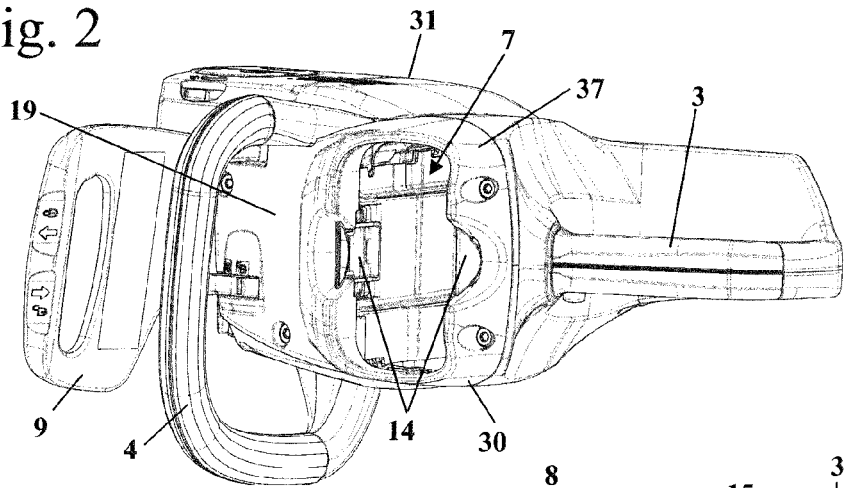
FIG. 2 is a perspective view from above onto the chain saw with the battery pack removed.

As FIG. 2 shows, the battery pack 8 is held in the housing 2 via two battery latching mechanisms 14. The battery latching mechanisms 14 partially cover openings on the housing of the battery pack 8, so that the entry of dirt particles from the second cooling air flow 23 into the battery pack 8 is avoided.

Figure 3:
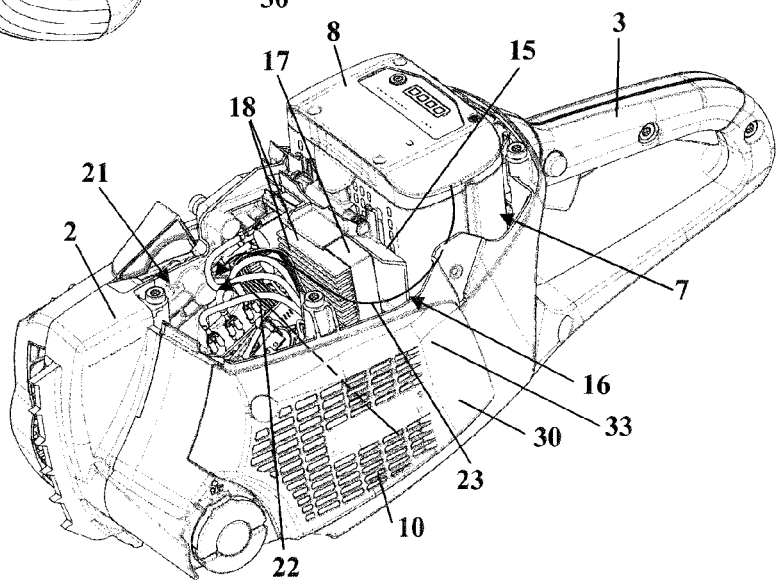
FIG. 3 is a perspective view onto the chain saw with the battery pack and removed top housing cover.

As FIG. 3 shows, an interior housing space 21, in which the first cooling air flow 22 opens, is formed in the housing 2. The interior housing space 21 is separated from the receptacle 7 by an intermediate plate 15. In this embodiment, the intermediate plate 15 is part of a contact plate for the battery pack 8. A second gap 16, via which the second cooling air flow 23 passes into the interior housing space 21, is formed between the intermediate plate 15 and the housing wall 33 of the housing 2. An electronic control 17 is arranged in the interior housing space 21 adjacent to the intermediate plate 15. The control 17 has a plurality of cooling ribs 18 which are at least partially arranged in the second cooling air flow 23. The control 17 and the cooling ribs 18 are arranged above the air inlet opening 10 in the typical working position of the chain saw 1, so that the first cooling air flow 22 only reaches the cooling ribs 18 of the control 17 after an upward redirection.

Figure 4:
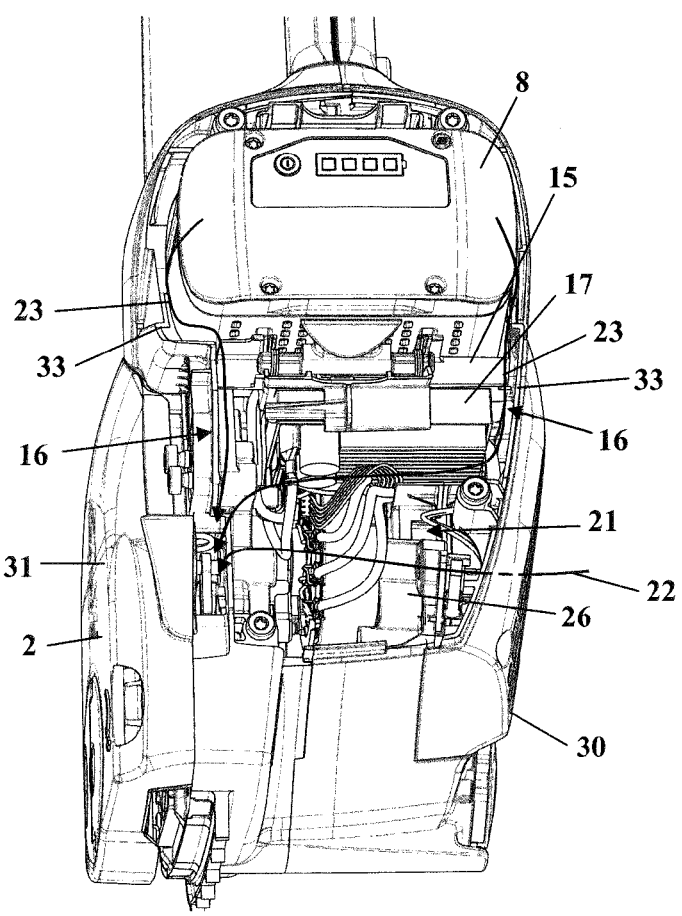
FIG. 4 is a perspective view from above onto the chain saw of FIG. 3.

As FIG. 4 shows, a portion of the second cooling air flow 23 as well as the first cooling air flow 22 initially flow from the first longitudinal side 30 to the second longitudinal side 31 in the interior housing space 21. As FIG. 4 shows the control 17 is arranged on the intermediate plate 15 adjacent to the second gap 16. The air outlet opening 13 is arranged in the area below the air inlet opening 10. The chain saw 1 has a drive motor 24 which is configured as an electronically commutated external rotor motor. The drive motor 24 drives the saw chain 6 and is controlled by the control 17. FIG. 4 shows the flow of the second cooling air flow 23. The second cooling air flow 23 flows into the interior housing space 21 on the first longitudinal side 30 as well as the oppositely situated second longitudinal side 31 of the chain saw 1. The longitudinal sides 30 and 31 are, thereby, aligned approximately in the direction of the guide bar 5. The partial flow of the second cooling air flow 23, which at the first longitudinal side 30 flows through between the wall 33 and the intermediate plate 15, flows along the control 17 in the interior housing space 21.

Figure 5:
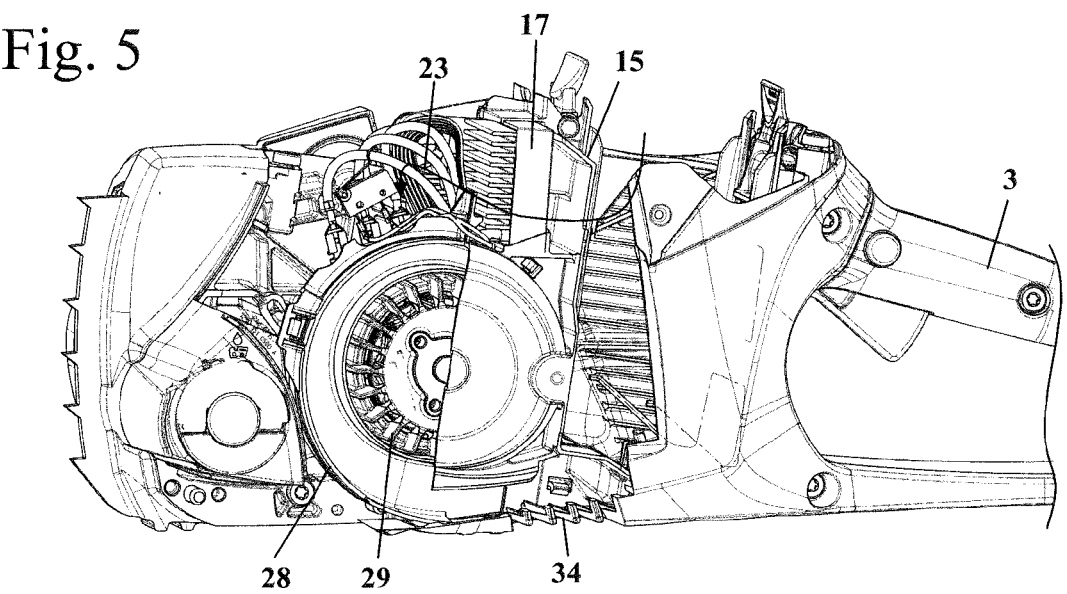
FIG. 5 is a partially cutaway, perspective side view of the chain saw with the battery pack removed.

As FIG. 5 shows, the chain saw 1 has a blower wheel 29 on whose outer periphery a blower spiral 28 is formed. The blower wheel 29 pulls the two cooling air flows 22 and 23 from the first longitudinal side 31 in the direction of the second longitudinal side 30 and then conveys the cooling air flows 22 and 23 through the blower spiral 28 via the air outlet opening 13 and to the ambient. The air outlet opening 13 is also covered by a grid 34 (FIG. 5).

Figure 6:
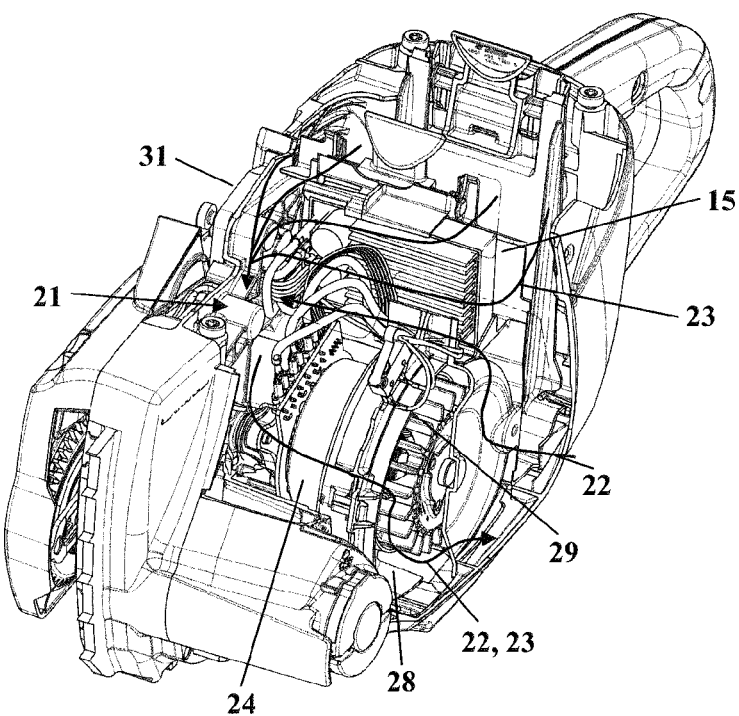
FIG. 6 is a perspective view from above onto the chain saw of FIG. 5.

As FIG. 6 shows, the second cooling air flow 23 also flows into the interior housing space 21 at the intermediate plate 15 also in the region of the top side of the housing 2. In the region of the second longitudinal side 31, the first cooling air flow 22 and the second cooling air flow 23 flow together and are redirected downward and in the direction toward the first longitudinal side 30.

Figure 7:
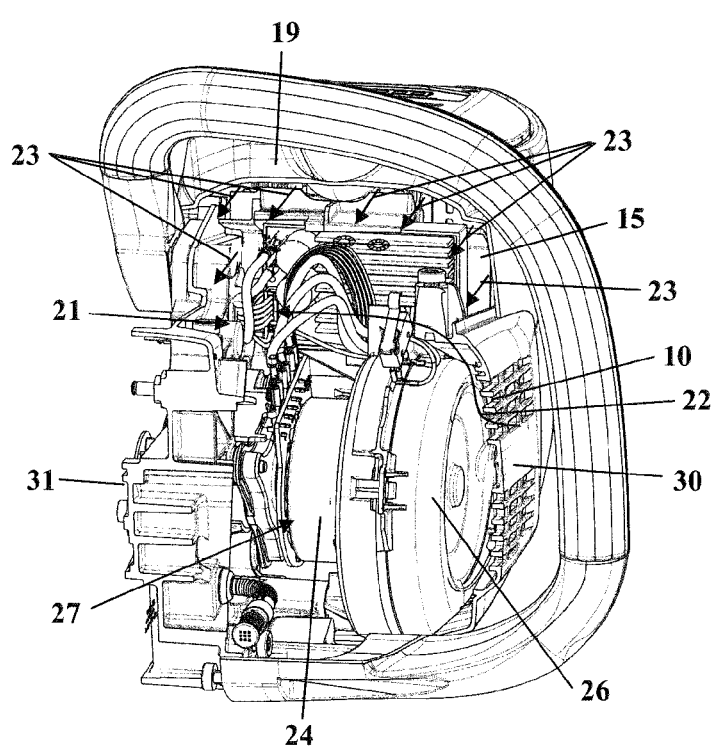
FIG. 7 is a partially cutaway, perspective view of the chain saw from the side facing the guide bar.
Figure 9:
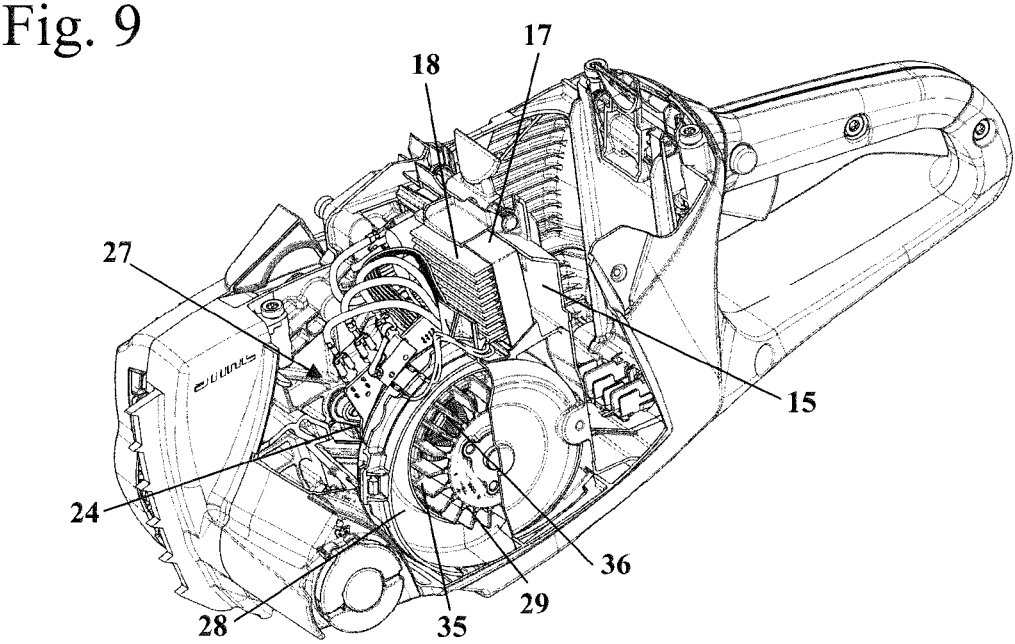
FIG. 9 is a partially cutaway, perspective view of the chain saw.

As FIG. 7 shows, a motor receiving space 27, in which the drive motor 24 is arranged, is formed below the interior housing space 21. FIG. 9 also shows the arrangement of the drive motor 24 in the motor receiving space 27. In the region of the blower wheel 29, the drive motor 24 is covered by a cover 26 which in its interior forms the blower spiral 28. As FIG. 7 also shows, the second cooling air flow 23 is drawn into the interior housing space 21 at the two longitudinal sides 30 and 31 as well as at the top side 19.

Figure 8:
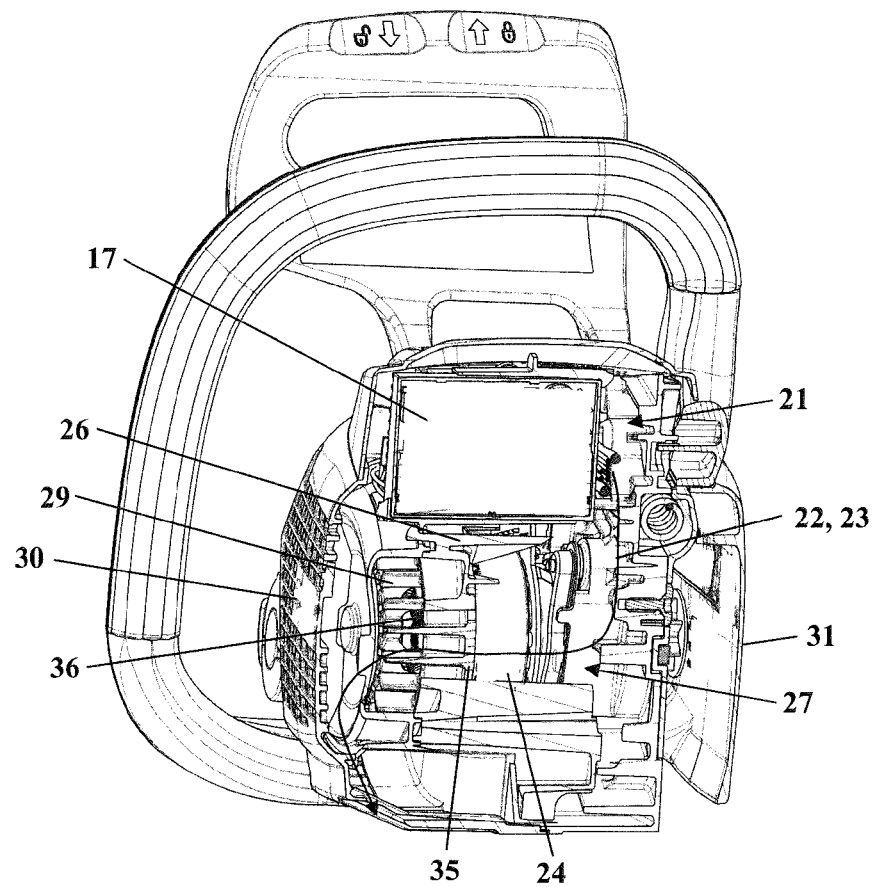
FIG. 8 is a perspective section view from the end facing away from the guide bar.

As FIG. 8 shows, the drive motor 24 has a rotor 35 on which the blower wheel 29 is integrated, and a stator 36 which includes the windings arranged inside the rotor 35. In the region of the drive motor 24, the cooling air flows 22 and 23 are conveyed from the second longitudinal side 31 to the first longitudinal side 30.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
an electric drive motor;
a power supply unit for said drive motor;
a housing having a power supply receptacle for said power supply unit;
an electronic control;
a fan wheel for moving cooling air;
said drive motor being configured to drive said fan wheel;
said housing defining an interior housing space;
said electronic control being arranged in said interior housing space;
a motor receptacle for accommodating said drive motor therein;
said housing including a first longitudinal side and a second longitudinal side arranged opposite to said first longitudinal side;
said housing having at least one air inlet opening for the cooling air and having an air outlet opening through which the cooling air passes out of said housing;
said at least one air inlet opening being arranged on said first longitudinal side so as to fluidly communicate with said interior housing space;
said fan wheel drawing in a first cooling air flow through said at least one air inlet opening during operation;
said first cooling air flow entering said housing through said at least one air inlet opening on said first longitudinal side and flowing in said interior housing space from said first longitudinal side toward said second longitudinal side so as to first cool said electronic control;
said first cooling air flow being redirected by deflecting structure in said interior housing space adjacent to said second longitudinal side in said housing and flowing back toward said first longitudinal side and said air outlet opening;
said drive motor being disposed between said second longitudinal side and said air outlet opening so as to be cooled by said first cooling air flow subsequent to the cooling of said electronic control;
said power supply receptacle and said power supply unit being configured to conjointly define a second air inlet opening for passing a second cooling air flow into said power supply receptacle;
said housing including passage defining structure configured to fluidly connect said power supply receptacle to said interior housing space so as to permit said second cooling air flow to enter said interior housing space from said power supply receptacle to also cool said electronic control; and,
said fan wheel being fluidly connected to said interior housing space so as to move said first and second cooling flows therefrom to said air outlet opening.

2. The work apparatus of claim 1, further comprising:
a work tool;
said receptacle for said power supply unit being arranged at a location facing away from said work tool; and,
said at least one air inlet opening for said first cooling air flow being closer to said work tool than said receptacle of said power supply unit.

3. The work apparatus of claim 1, wherein:
said receptacle has an edge; and,
said second air inlet opening being a gap between said edge of said receptacle and said power supply unit via which said second cooling air flow is to be drawn in.

4. The work apparatus of claim 1, wherein said passage defining structure includes an intermediate plate configured to separate said interior housing space from said receptacle for said power supply unit.

5. The work apparatus of claim 4, wherein:
said housing has a housing wall;
said intermediate plate and said housing wall conjointly define said passage defining structure as a gap between said intermediate plate and said housing wall through which said second cooling air flow flows into said interior housing space of said work apparatus.

6. The work apparatus of claim 5, wherein said electronic control is arranged adjacent to a section of said gap.

7. The work apparatus of claim 1, wherein:
said at least one air inlet opening for said first cooling air flow opens into said interior housing space; and,
said electronic control is arranged above said at least one air inlet opening for said first cooling air flow.

8. The work apparatus of claim 1, wherein said air outlet opening is arranged near said first longitudinal side and under said at least one air inlet opening.

9. The work apparatus of claim 1, wherein said passage defining structure includes structure for directing said second cooling air flow out of said receptacle of said power supply unit into said interior housing space at said first longitudinal side and said second longitudinal side.

10. The work apparatus of claim 1, wherein said power supply unit is a battery pack.

11. The work apparatus of claim 1, wherein:
said drive is an external rotor motor having a rotor; and,
said fan wheel is integrated on said rotor of said drive motor.

12. The work apparatus of claim 1, wherein:
said work apparatus is a chain saw having a rear handle and a bale handle;
said housing has a top side;
said receptacle for said power supply unit is arranged on said top side of said housing between said rear handle and said bale handle.

13. A handheld work apparatus comprising:
an electric drive motor;
a power supply unit for said drive motor;
a housing having a receptacle for said power supply unit;
an electronic control;
a fan wheel for moving cooling air;
said drive motor being configured to drive said fan wheel;
said housing defining an interior space for accommodating said electronic control therein and having at least one air inlet opening for cooling air;
said fan wheel drawing in a first cooling air flow through said at least one air inlet opening during operation;
said receptacle being configured to facilitate passing a second cooling air flow drawn into said housing via said fan wheel; and, said housing including structure arranged between said receptacle and said interior space to direct said second cooling air flow to cool said electronic control.

14. The work apparatus of claim 13, wherein said electronic control has at least one rib over which said second cooling air flow flows.

\* \* \* \* \*